March 11, 1930.   O. W. PENDERGAST   1,750,192
TAG
Filed July 20, 1928    2 Sheets-Sheet 1
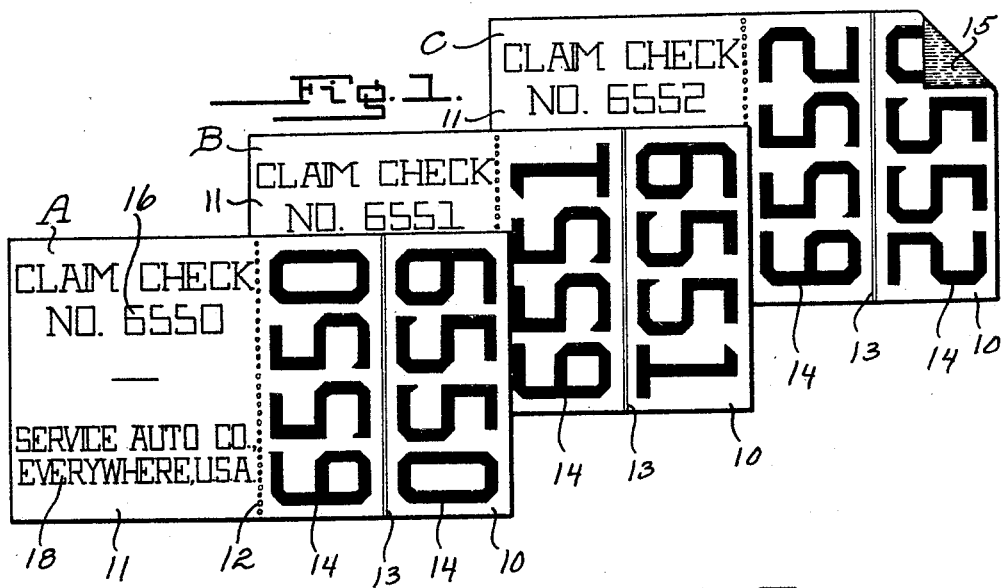
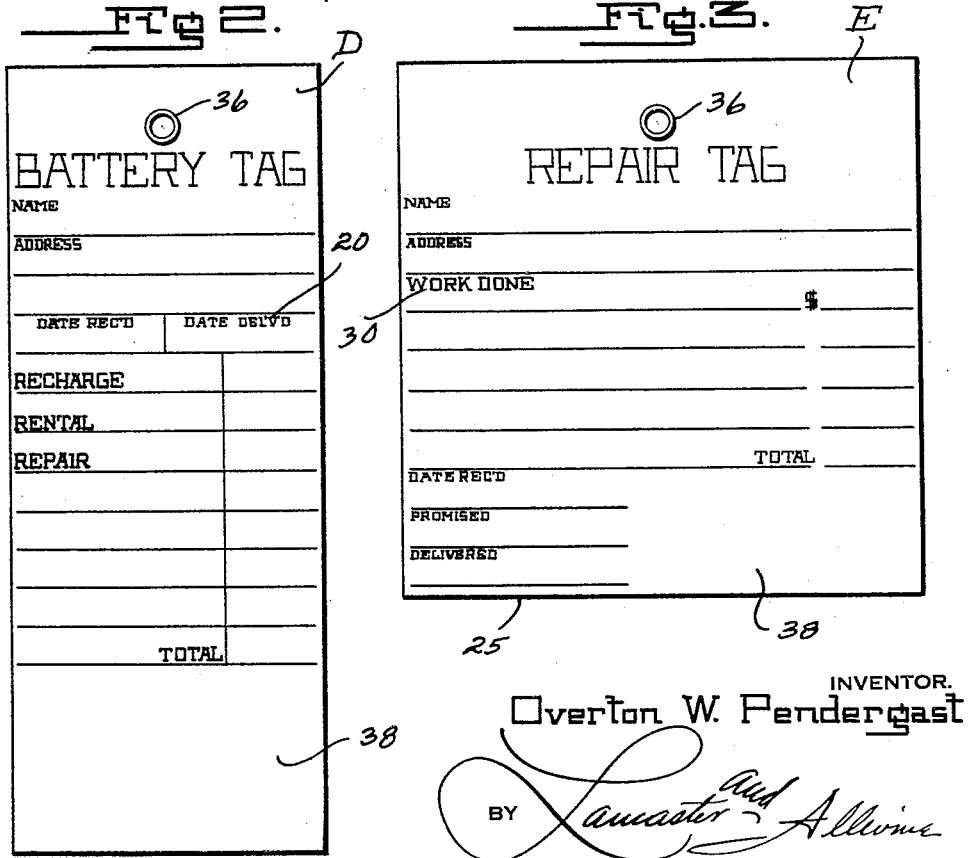
INVENTOR.
Overton W. Pendergast
BY Lancaster and Allwine
ATTORNEYS.

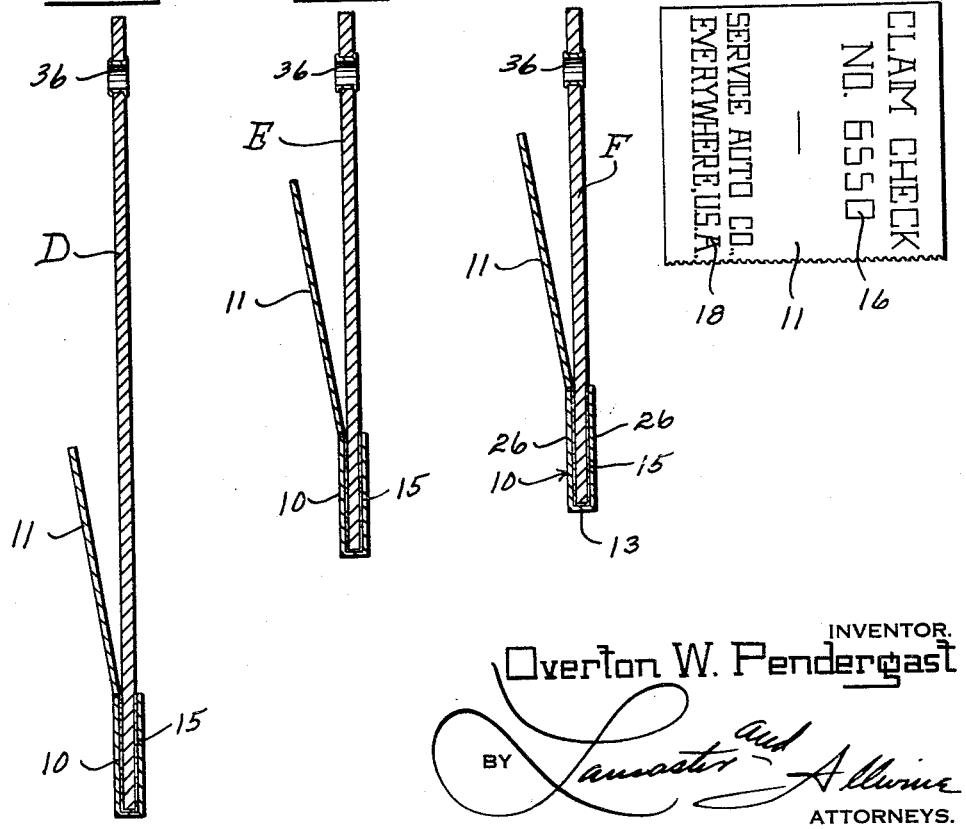

Patented Mar. 11, 1930

1,750,192

UNITED STATES PATENT OFFICE

OVERTON W. PENDERGAST, OF TERRE HAUTE, INDIANA

TAG

Application filed July 20, 1928. Serial No. 294,222.

The present invention relates to improvements in service tags and more specifically to identification means therefor, embodying a detachable portion.

Concerns such as garages and repair shops of various kinds find it necessary to employ various types and sizes of service tickets or tags for use upon the various jobs received. These service tags are ordinarily consecutively numbered for identification purposes and quite often embody portions serving as claim checks for use by the customer when receiving the finished work. Claim checks on service tags and tickets serve a similar purpose and are most often alike in size and copy, while the main body portions of the tags according to their intended use, differ greatly in size and strength of material. Ticket printers often carry as a regular line of products, a large number of standard size tags, and which tags are printed and carried in stock. When an order is received by the printer for any particular type of tag, the tags are printed with consecutive numbers and the customer's name, the numbers and name being printed in duplicate so that the name and numbers appear both on the claim check and also on the main body portion of the tag. If the service tag printer carries twenty-five standard size tickets, each order received for each job requires a different "form lock up and press make ready" in order to complete the order. This procedure is very costly and aside from limiting the identification numbers to a small size capable of being printed by the automatic numbering machine, requires that the claim check portion be of the same expensive stock required for the main body portion of the tag.

It is a primary object of the invention to provide a type of service tag which will allow the printing of the numbers and name all at one time with one "lock up and make ready," by the use of one press and one pressman, in lots of many at one time instead of singly for many different kinds and sizes of service tags.

A further object of the invention resides in the provision of a tag identification device serving to eliminate the necessity of printing the claim check portion of the tag on strong and expensive stock because the main body portion of the tag is required to be made of such stock because of the intended use of the tag.

A further object of the invention is to provide an identification means for service tags of various sizes and shapes embodying an identification portion and a claim check portion which is readily severable from the identification portion when applied to the service tag.

A still further object of the invention resides in the novel provision of means whereby identification numbers may be consecutively applied to various types of service tickets as the different jobs are received for simplified keeping of records.

A still further object of the invention is to provide an identification device for use upon various sizes and shapes of service tags in such manner as to have large identification numbers displayed at each face of the tag and visible to an observer regardless of the position of the tag.

Other objects and advantages of the invention will be apparent during the course of the following detailed description, taken in connection with the accompanying drawings and in which drawings:

Figure 1 is a plan view of a series of consecutively numbered identification devices.

Figures 2, 3 and 4 are views illustrating modified types of service tags for receiving the identification devices as illustrated in Figure 1.

Figure 5 is a face plan view of the service tag illustrated in Figure 4 and showing the identification device applied thereto.

Figure 6 is a view substantially similar to that shown in Figure 5 but showing the detachable claim check portion having been severed from its connection with the identification portion of the device and one lower corner of the tag turned up.

Figure 7 is a plan view of the claim check portion as detached from the identified tag illustrated in Figure 6.

Figures 8, 9 and 10 are central vertical sections respectively thru the forms of tags shown in Figures 2, 3 and 4 and showing an identification device applied to the lower portion of each tag.

Referring to the drawings in detail, and wherein similar reference characters designate corresponding parts throughout the several views, and referring particularly to Figure 1 of the drawings, the letters A, B and C designate three of a group of any desired number of consecutively numbered identification devices. The letters D, E and F illustrate three different sizes and types of service tickets with which the devices may be associated for identification purposes.

The identification devices are preferably formed from a cheap, light grade of stock and each embodies an identification portion 10 and a claim check portion 11 which are readily separable from one another along a transverse weakening line 12 in the present instance shown as a series of perforations extending transversely of the device.

Printed in duplicate upon the front surface of the identification portion 10 and in reverse relation at opposite sides of the medial fold lines 13 are large identification numbers 14. These identification numbers 14 are printed from type alone and are of a size larger than numbers capable of being printed from automatic numbering machines. The numbers 14 are printed upon the portion 10 with the bases of the numbers adjacent and slightly spaced from the medial fold lines 13 and with the vertical axes of the numbers traversing at a right angle the medial fold lines. The opposite or rear surface of the portion 10 is covered throughout with a suitable adhesive as designated at 15, whereby the identification devices may be attached to the service tags in a manner to be later explained.

The check portion 11 and which is readily separable from the portion 10 along the line of perforation 12, has printed thereon the words "Claim check," together with a number as at 16 corresponding to the large duplicated identification numbers printed on the portion 10. The check portion 11 has also printed thereon the name of the concern or person using the devices together with what other form of information the user may desire to have printed on the check. The rear surface of the check portion 11 is devoid of any adhesive material as will be apparent by observing Figures 8, 9 or 10. It may here be well to state that the identification devices are printed and retained in stock with all of the imprints as shown in Figure 1 except for the name and address of the user such as designated by the numeral 18. The foregoing will permit of the devices being printed in this manner in large quantities with one "lock up and make ready" for each device, and after which suitable gathering operatons may be performed for gathering the devices into groups of consecutively numbered identification devices.

This arrangement will permit of the devices being printed from type alone without the employment of expensive automatic numbering machines.

An alternative method of printing the devices however would be to print the large identification numbers 14 upon the identification portion 10 and print the entire matter upon the check portion 11 at one operation as the orders are received for the devices, with the aid of an automatic numbering machine set to print the numbers as at 16 to correspond with the type printed large identification numbers 14. With this method it will be seen that the numbers 16 and other data appearing upon the check portion 11 may be printed at one time with one "lock up and one make ready."

As an illustration, the service tag D has printed matter 20 thereon rendering the tags adapted for use as a battery tag; the service tag E having data 30 printed thereon rendering the tag susceptible to use as a general repair tag; while the service tag F has suitable data 35 printed thereon for rendering the tag susceptible to use as a tire tag. As in practice, these tags such as illustrated are of different sizes and shapes and are made of different grades of stock such as heavy paper or cardboard for rendering the tags adaptable to the various uses for which the particular tags are intended. The tags are each preferably provided adjacent their upper portions with metal eyelets 36 for receiving a suitable tie string or the like, and each of the tags has a blank space as at 38 on which no printed matter appears, and which blank spaces are preferably disposed at the lower portions of the tag. These blank spaces 38 provide means for attachment of the identification devices without covering any of the information printed upon the tag.

It will be noted that with either type of tag D, E or F that no identification numbers or names and addresses of the intended user appears upon the tag and therefor each tag may be printed in large quantities from a single "lock up and one make ready" and retained in stock by the service ticket printer for immediate shipment to users upon receipt of an order for any particular type of tag.

In Figure 1 it will be seen that the devices A, B and C have been consecutively numbered with the identification numbers 6550, 6551 and 6552 respectively and that the check portion 11 of each device bears the numeral designated at 16 corresponding to the large identification numbers 14 printed upon the identification portions 10.

In using one of the devices for identification of one of the tags D, E or F, it is merely necessary to moisten the entire rear surface of the identification portion 10 and then apply the portion 10 to the lower edge portion of the tag so that the medial fold lines 13 extend along the bottom edge 25 of the tag as in Figures 8, 9 and 10 and affix the leaves 26 to opposite faces of the tag by the adhesive 15 and which will cause the large identification numbers 14 to be displayed in a readable position at both sides of the tag. When the device is so attached to the tag the check portion 11 is free to be detached from the portion 10 along the perforated line 12. While the devices have been shown applied to the tag bodies by means of providing a gummed back for the portion 10, the devices may be affixed to the tags in any other desired manner as by means of suitable staples or by applying adhesive to the back of the portion 10 when attaching the devices to the tags. When the identification portions 10 are so attached to the tag it will be seen that the identification numbers 14 may be easily read at some distance from the tag regardless of which face of the tag is exposed to view.

In the method of manufacture and procedure of distribution of the service tags, should the service ticket printer receive an order say for one thousand tire tags as illustrated in Figure 4, the service ticket printer merely obtains from his stock, one thousand of the tire tags and a group of one thousand consecutively numbered identification devices which have been previously printed with the large identification numbers 14. With a single "lock up and one make ready", the check portions 11 of the devices are quickly and easily printed thru the use of one press and one pressman. The devices may then be applied to the tags as shown in Figure 5 and delivered to the customer as a unit, or these tags and identification devices may be delivered in separate groups for application of the devices to the tags as used.

Should the service ticket printer receive an order for five hundred battery tags, five hundred repair tags, and five hundred tire tags, and which would necessitate the use of fifteen hundred consecutively numbered identification devices for identification of the tags when used, the service ticket printer merely secures from the stock of previously printed service tags, five hundred of each of the different sizes and types of tags ordered. Since the tags ordered are each of different sizes and shapes it would require a different "form lock up and make ready" for each type of tag in order to complete the order. However, since the check portions of the identification devices are each of like dimensions, the printer merely obtains fifteen hundred consecutively numbered devices which have been previously printed with the large identification numbers 14 and with one "lock up and one make ready", with the aid of an automatic numbering device prints the required data upon the check portion of each of the fifteen hundred identification devices. The different types of tags and consecutively numbered devices may then be shipped to the user for enabling the user to apply the consecutively numbered devices to either type of tag as the various types of jobs are received. Thus it will be seen that thru attachment of the identification device to the tag, such eliminates the necessity of printing the claim check portion on an integral part of the tag's body which is ordinarily made of strong expensive stock for withstanding a certain amount of rough usage without becoming torn or distorted.

From the foregoing description it will be apparent that a novel and improved type of service tag has been provided which will permit the printing of the claim check numbers and name of the user at one operation with one "lock up and one make ready", and by the use of one press and one pressman. It will also be apparent that a novel arrangement has been provided wherein service tickets of various sizes and types may be consecutively numbered for identification purposes in a manner whereby large identification numbers will be visible at both sides of the tag.

Changes in detail may be made to the form of invention herein shown and described, without departing from the spirit of the invention or the scope of the following claims.

I claim:

1. A service tag comprising a tag body portion, and an identification device embodying an identification portion folded over one edge portion of the tag body portion and having large identification numbers printed in duplicate upon one face thereof for display at opposite faces of the tag body portion, and a separable check portion having printed thereon with small type, an identification number corresponding to the identification numbers on the identification portion.

2. A service tag comprising a tag body portion, and an identification device embodying an identification portion and a check portion separated by a perforated severing line, said identification portion having large identification numbers printed in duplicate and in reverse relation upon one surface thereof and secured over one edge of the tag body portion for disposing the numbers at opposite faces of the tag body portion, and said check portion bearing a number in small type corresponding to the large identification numbers on the identification portion and superposed upon the face side of the tag body portion.

3. A service tag comprising a tag body portion, and an identification device embodying an identification portion doubled over one edge portion of the tag body and secured thereto, said identification portion having identification numbers duplicated thereon at opposite sides of the line on which it is folded, and a check portion separable from the identification portion and having an identification number printed thereon to correspond with the identification numbers of the identification portion.

4. A service tag comprising a tag body portion having printed matter thereon and a blank space along one edge portion of the body, and an identification device embodying an identification portion doubled over one edge of the tag body portion and secured thereto over said blank space, said identification portion forming leaves at opposite sides of the tag body each having a like identification number printed thereon, and a check portion separably connected with one of said leaves and having an identification number printed thereon corresponding with the identification numbers on said leaves.

5. A service tag comprising a tag body portion having attaching means at its upper end, and an identification device embodying an identification portion doubled over the lower edge of the tag body portion and having identification numbers duplicated thereon in reverse relation at opposite sides of the line on which the identification portion is folded for displaying like identification numbers at opposite faces of the tag body portion, said identification numbers having their bases adjacent, and a check portion separably connected to the identification portion and superposed upon the face side of the body portion, said check portion bearing an identification number corresponding to the identification numbers on the identification portion.

6. A service tag comprising a tag body portion having printed matter upon the face side thereof and having a blank space provided at the lower portion of the tag body, and an identification device embodying an identification portion having an adhesive applied thruout its rear surface and having large identification numbers printed in duplicate and in reverse relation upon its front surface, said identification portion being folded between the identification numbers providing leaves for attachment to opposite faces of the tag body portion at said blank space, and a claim check portion separably connected with the upper edge of the leaf of the identification portion disposed at the face side of the tag body portion.

OVERTON W. PENDERGAST.